US008503080B2

(12) United States Patent
Seesselberg et al.

(10) Patent No.: US 8,503,080 B2
(45) Date of Patent: Aug. 6, 2013

(54) DIFFRACTIVE OPTICAL ELEMENT AND USE OF AN OPTICAL ADHESIVE FOR PRODUCING THE SAME

(75) Inventors: Markus Seesselberg, Aalen (DE); Hans-Joachim Weippert, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 454 days.

(21) Appl. No.: 12/739,702

(22) PCT Filed: Sep. 19, 2008

(86) PCT No.: PCT/EP2008/007876

§ 371 (c)(1), (2), (4) Date: Aug. 23, 2010

(87) PCT Pub. No.: WO2009/056196

PCT Pub. Date: May 7, 2009

(65) Prior Publication Data

US 2011/0026118 A1 Feb. 3, 2011

(30) Foreign Application Priority Data

Oct. 31, 2007 (DE) ......................... 10 2007 051 887

(51) Int. Cl.
*G02B 5/18* (2006.01)

(52) U.S. Cl.
USPC ........................................................ 359/576

(58) Field of Classification Search
USPC ........................................................ 359/576
See application file for complete search history.

(56) References Cited

U.S. PATENT DOCUMENTS

| | | | | |
|---|---|---|---|---|
| 5,734,502 | A | 3/1998 | Ebstein | |
| 2004/0263982 | A1 | 12/2004 | Ishii | |
| 2005/0073747 | A1 * | 4/2005 | Suzudo | 359/566 |
| 2006/0268414 | A1 * | 11/2006 | Tokoyoda | 359/569 |

FOREIGN PATENT DOCUMENTS

| | | |
|---|---|---|
| DE | 195 33 591 | 3/1996 |
| EP | 1 677 128 | 7/2006 |
| WO | WO 03/065041 | 8/2003 |
| WO | WO 2007/089073 | 8/2007 |

* cited by examiner

*Primary Examiner* — Alessandro Amari
(74) *Attorney, Agent, or Firm* — Fish & Richardson P.C.

(57) ABSTRACT

A diffractive optical element is provided, which includes a first layer having a material of a refractive index $n_1(\lambda)$, a second layer, adjacent to the first layer, having a material of a refractive index $n_2(\lambda)$ and a diffraction structure formed at the interface between the first layer and the second layer. The material of at least one of the two layers is obtained by curing an optical adhesive.

33 Claims, 16 Drawing Sheets

DIFFRACTIVE OPTICAL ELEMENT AND USE OF AN OPTICAL ADHESIVE FOR PRODUCING THE SAME

This application is the National Stage of International Application No. PCT/EP2008/007876, filed Sep. 19, 2008, which claims the benefit of German Application No. 10 2007 051 887.2, filed Oct. 31, 2007.

The invention relates to a diffractive optical element, having a) a first layer consisting of a material having a refractive index $n_1(\lambda)$;

b) a second layer, adjacent to the first layer, consisting of a material having a refractive index $n_2(\lambda)$;

c) a diffraction structure formed at the interface between the first layer and the second layer.

In broadband optical systems, for example in photographic objective lenses, displays and eyepieces, diffractive optical elements (DOEs) are often used in order to correct chromatic aberrations. Diffractive optical elements which are made of a single material are known, with a diffraction structure extending on the interface between this material and air.

In such diffractive optical elements, the diffraction efficiency $\eta(\lambda)$ depends very strongly on the wavelength $\lambda$; such diffractive optical elements are usually tuned to a working wavelength $\lambda_0$ at which, theoretically, a diffraction efficiency of 100% can be achieved. At wavelengths which are shorter or longer than the working wavelength $\lambda_0$, however, the diffraction efficiency is often less than 80% to 90%, the remaining light being diffracted into undesired diffraction orders. This so-called stray light often leads to a strong contrast reduction, and sometimes even to double images. Such phenomena reduce the quality of the optical systems in which such diffractive optical elements are used. The quality reduction can be so extensive that it is no longer viable to use diffractive optical elements which consist of a single material.

In order to overcome this problem, in the past diffractive optical elements have been proposed in which two layers consisting of different materials lie adjacent to one another and the diffraction structure is formed on the interface between the first layer and the second layer. Such diffractive optical elements of the type mentioned in the introduction are known, for example, from DE 195 33 591 A1 or U.S. Pat. No. 5,734,502 A.

If the refractive indices $n(\lambda)$ of the two materials, each of which forms a layer, are matched to one another appropriately, it is possible to achieve a diffraction efficiency $\eta(\lambda)$ which lies at higher values over a larger wavelength range than is possible with diffractive optical elements consisting of only one optical material.

The diffraction structures of diffractive optical elements can have various profiles. Diffractive optical elements are known with binary, sinusoidal, blazed, arbitrarily trapezoidal and arbitrarily binary-rounded profiles. In general, diffractive optical elements diffract light into a multiplicity of diffraction orders. In order to achieve a high efficiency in a selected diffraction order, structures with blazed profiles are often used. This is intended to mean an asymmetrically triangular profile with a blaze edge inclined with respect to a reference plane and an anti-blaze edge, in general perpendicular to this reference plane, the extent of which in the direction perpendicular to the reference plane defines a profile depth h. Such a diffraction structure may be formed both on an interface extending in a planar fashion and on a curved interface between the first and second layers. In other words, the diffraction structure may extend parallel to a plane surface or parallel to a curved surface. In the latter case, a separate reference plane is to be assigned to each pair consisting of a blaze edge and an anti-blaze edge.

If a diffractive optical element has two mutually adjacent layers consisting of materials with different refractive indices $n_1(\lambda)$ and $n_2(\lambda)$, when selecting the profile depth h of $$h=\lambda_0/(n_1(\lambda_0)-n_2(\lambda_0)) \quad (1)$$

with $n_1(\lambda_0)>n_2(\lambda_0)$ then, with neglect of rigorous effects and with normal light incidence, a diffraction efficiency of 100% is obtained in the first diffraction order at the working wavelength $\lambda_0$. The diffraction efficiency $\eta(\lambda)$ depends commensurately less on the angle of incidence of the light when the profile depth h becomes smaller. If a diffraction efficiency of approximately 100% is intended to be achieved in the $m^{th}$ diffraction order, then the profile depth h must be increased by the factor m.

With this profile depth h, according to Equation (1) the phase change $\Phi(\lambda)$ for light rays striking the two edges of a profile perpendicularly is given as $$\begin{aligned}\Phi(\lambda) &= (2\pi h/\lambda)\cdot((n_1(\lambda)-n_2(\lambda)) \quad (2)\\ &= (2\pi\lambda_0/\lambda)\cdot((n_1(\lambda)-n_2(\lambda))/(n_1(\lambda_0)-n_2(\lambda_0))).\end{aligned}$$

From scalar theory, it follows that the diffraction efficiency $\eta(\lambda)$ in the first diffraction order is given as a function of the wavelength $\lambda$ by $$\eta(\lambda)=\sin c^2((\Phi(\lambda)/(2\pi))-1); \quad (3)$$

with $\sin c(x)=\sin(\pi x)/(\pi x)$.

The optimal diffraction efficiency $\pi(\lambda)$, which in particular is independent of the wavelength $\lambda$, is obtained when the refractive indices $n_1(\lambda)$ and $n_2(\lambda)$ are selected so that the phase change $\Phi(\lambda)$ likewise does not depend on the wavelength $\lambda$. In this case, $\Phi(\lambda)=2\pi$.

From Equation (2), it follows from this that $$n_1(\lambda)=n_2(\lambda)+(\lambda/\lambda_0)(n_1(\lambda_0)-n_2(\lambda_0)) \quad (4)$$

and from this in turn that $$\Delta n(\lambda)=(\lambda/\lambda_0)\Delta n(\lambda_0) \quad (5)$$

in respect of the refractive indices of the materials used for the first and second layers of the diffractive optical element.

This means that the difference between the two refractive indices $\Delta n(\lambda)=n_1(\lambda)-n_2(\lambda)$ merely needs to be a linear function of the wavelength $\lambda$. Although this cannot be achieved exactly for real materials, it is nevertheless possible to find material combinations which very nearly approximate this condition.

From the relationship given above, it also follows that the less refractive material with the refractive index $n_2(\lambda)$ must have a higher dispersion than the more highly refractive material with the refractive index $n_1(\lambda)$, which necessarily restricts the viable material combinations since a higher refractive index is often associated with a higher dispersion. The dispersion of a glass increases as the Abbe number $\nu$ of this glass decreases.

It is known to combine more highly refractive glasses having comparatively low dispersion and less refractive optical plastics having comparatively high dispersion to form a diffractive optical element. Inter alia, it is known to combine the glass SSK3 (Schott) with polystyrene, and the glass K-LaFK 60 (Sumita) or the glass BSM81 (Ohara) with polycarbonate. The profile depths h in such diffractive optical elements lie between about 10.0 μm and about 30.0 μm. With previously known material combinations, however, difficulties arise in the production of the corresponding diffractive optical element, this usually being due to the fact that the two materials can only be bonded together comparatively poorly. These difficulties quite often give rise to defects in the diffractive optical element, so that it cannot be used in a high-quality optical system and sometimes even needs to be rejected.

Another difficulty of the previously used materials having the lower refractive index $n_2(\lambda)$, which may also be a mixture of a plurality of components, is that these materials cannot be adjusted particularly well in respect of their refractive index and the dispersion properties, so that again the material selection for the diffractive optical element's first layer with the higher refractive index $n_1(\lambda)$ is subject to great limitations.

It is an object of the invention to provide a diffractive optical element of the type mentioned in the introduction, which overcomes this problem, provides a good diffraction efficiency over a wavelength range and can be produced simply and economically. For a diffractive optical element of the type mentioned in the introduction, this object is achieved in that d) the material of at least one of the two layers is obtained by curing an optical adhesive.

Optical adhesives are intended to mean adhesives which can be used for the bonding of optical elements, for example lenses, prisms or the like, and in this case are provided in a correspondingly thin layer of a few μm between the elements to be bonded. Known optical adhesives are also referred to as fine cements.

The invention is based on the discovery that optical adhesives have properties which qualify them as a material for forming at least one layer of a diffractive optical element as proposed here.

Optical adhesives can usually be processed well, and therefore facilitate the production of a corresponding diffractive optical element overall.

Optical adhesives furthermore have the advantage that, depending on the basic substances of which they are composed, they can be adapted optimally to the first layer of the diffractive optical element over a satisfactory range in respect of their refractive index and their dispersion behaviour, in order to obtain a diffractive optical element having a high diffraction efficiency.

Furthermore, optical adhesives can also be adapted so that curing them entails only a small volume loss, the so-called volume shrinkage. This can be less than 6%. Undesirable stresses in the first layer can therefore be avoided during production of the diffractive optical element.

Optical adhesives furthermore have good elasticity properties, so that even sizeable differences in the expansion coefficients of the materials involved are possible.

Such a diffractive optical element is efficiency-achromatised, i.e. its diffraction efficiency is substantially independent of the wavelength in a working wavelength range. With such a diffractive optical element, Equations (4) or (5) above can approximately be satisfied so as to give a diffraction efficiency $\eta(\lambda)$ according to Equation (3) above of $\eta(\lambda)>95\%$ in relation to the working wavelength range of the diffractive optical element. It has been found particularly favourable for the optical adhesive to be based on an epoxy adhesive or a thiol-ene system.

Such optical adhesives can be mixed together with a favourable processing viscosity of between 200 mPas and 1000 mPas at 25° C. Optionally, the viscosity can be adjusted by using prepolymers or by adding reactive diluents or plasticisers. The latter will be discussed in more detail below.

The material of the second layer of the diffractive optical element, obtained from such optical adhesives, can furthermore have a sufficient transmission in the desired wavelength range.

Overall, the refractive index, the dispersion and the transmission can be specified as characteristic values for cured optical adhesives.

It has been found favourable in particular for the optical adhesive to comprise one or more of the following compounds: bis-[4-(2,3-epoxypropylthio)-phenyl]sulfide; N,N-diglycidyl-4-glycidyl-oxyaniline; bis-(3,4-epoxycyclohexyl)adipate; polyethylene glycol; bis-(4-vinylthiophenyl) sulfide; pentaerythritol tetra-(3-mercaptopropionate).

In respect of bis-[4-(2,3-epoxypropylthio)-phenyl]sulfide, it is advantageous for this to be used in an amount of from about 20.00% to about 85.00%, expressed in terms of the total weight of the optical adhesive.

In respect of N,N-diglycidyl-4-glycidyl-oxyaniline, it is favourable for this to be used in an amount of from about 24.00% to about 33.00%, expressed in terms of the total weight of the optical adhesive.

For a first type of optical adhesive, it is favourable that it should contain a curer, in particular an amine curer. To this end, the optical adhesive preferably comprises one or more of the following compounds as a curer: trimethylhexamethylene-1,6-diamine; diamino-m-xylene; naphthalene-methylamine; isophorone diamine.

In this case, it is favourable for the optical adhesive to comprise as a curer one of the following compounds in the amounts specified, expressed in terms of its total weight: trimethylhexamethylene-1,6-diamine in an amount of from about 16.00% to about 18.50%; diamino-m-xylene in an amount of from about 14.00% to about 15.00%, preferably in an amount of about 14.53%; naphthalene-methylamine in an amount of from about 28.00% to about 29.00%, preferably in an amount of about 28.57%; isophorone diamine in an amount of from about 13.50% to about 14.50%, preferably in an amount of about 14.06%.

As an alternative to the first type of optical adhesive, it may be favourable for the optical adhesive to be curable by means of electromagnetic radiation, in particular by means of UV light.

In this case, an optical adhesive may preferably be used which comprises one of the following compounds in the amounts specified, expressed in terms of its total weight: bis-(3,4-epoxycyclohexyl) adipate in an amount of from about 55.00% to about 65.00%, preferably from about 59.00% to about 61.00% and more preferably about 59.52%; bis-(4-vinylthiophenyl)sulfide in an amount of from about 50.00% to about 80.00%, preferably from about 56.00% to about 77.00% and more preferably about 56.2% or about 76.34%; pentaerythritol tetra-(3-mercaptopropionate) in an amount of from about 17.00% to about 45.00%, preferably from about 19.00% to about 44.00% and more preferably about 19.85 or about 43.8%.

For an optical adhesive which can be cured by means of electromagnetic radiation, it may be advantageous that it comprises polyethylene glycol in an amount of from about 15.00% to about 20.00%, preferably from about 17.00% to about 19.00% and more preferably 17.86%, expressed in terms of its total weight.

It is furthermore advantageous for the optical adhesive, which can be cured by means of electromagnetic radiation, to comprise a photoinitiator. This is preferably provided in the form of triarylsulfonium salts, particularly in the form of triarylsulfonium hexafluoroantimonates or triarylsulfonium hexafluorophosphates, when the optical adhesive is based on an epoxy compound. The latter photoinitiators are respectively available under the names "CYRACURE® UVI-6974" and "CYRACURE® UVI-6990" from Dow Chemical Ltd.

If the optical adhesive is based on a thiol-ene system, a radical photoinitiator will be used as the photoinitiator, preferably a mixture consisting of 25% bis(2,6-dimethoxybenzoyl)-2,4,4-trimethylpentylphosphine oxide and 75% 2-hydroxy-2-methyl-1-phenyl-propan-1-one. Such a mixture is available under the name "IRGACURE® 1700" from Ciby-Geigy Ltd. As an alternative, 2-hydroxy-2-methyl-1-phenyl-propan-1-one or 1-[4-(1-methylethyl)-phenyl]-2-hydroxy-2-methyl-1-propan-1-one may be used. The latter are respectively available under the names "DAROCUR® 1173" and "DAROCUR® 1116" from Ciba-Geigy Ltd.

Triarylsulfonium hexafluorophosphate is in this case preferably contained in an amount of from about 2.00% to about 2.80%, preferably from about 2.25% to about 2.50% and more preferably about 2.38%, expressed in terms of the total weight of the optical adhesive. If a mixture consisting of 25% bis(2,6-dimethoxybenzoyl)-2,4,4-trimethylpentylphosphine oxide and 75% 2-hydroxy-2-methyl-1-phenyl-propan-1-one is used, this is preferably provided in an amount of from about 2.50% to about 4.50%, preferably about 3.05% or about 4.0%, expressed in terms of the total weight of the optical adhesive.

Depending on the material from which the other layer of the diffractive optical element is formed, it may be favourable for the optical adhesive to comprise an adhesion promoter, particularly in the form of a silane. In this case, it has been found favourable for the optical adhesive to comprise one of the following compounds as an adhesion promoter: 3-glycidyloxypropyltrimethoxysilane; 3-aminopropyltrimethoxysilane; 3-mercaptopropyl-trimethoxysilane; vinyltrimethoxysilane; 3-methacryloxy-propyltrimethoxysilane or a similar triethoxysilane. 3-Glycidyloxypropyltrimethoxysilane and 3-aminopropyltrimethoxysilane are used particularly when the optical adhesive is based on an epoxy compound. 3-Mercaptopropyl-trimethoxysilane, vinyltrimethoxysilane or 3-methacryloxypropyltrimethoxysilane or similar triethoxysilanes are used particularly when the optical adhesive is based on a thiol-ene system.

In particular, it has been found advantageous for the optical adhesive to comprise as an adhesion promoter one of the following compounds in the amounts specified, expressed in terms of its total weight: 3-glycidyloxypropyl-trimethoxysilane in an amount of from about 0.70% to about 2.40%; 3-mercaptopropyl-trimethoxysilane in an amount of from about 0.70% to about 0.80%, preferably about 0.76%.

As regards the processability of the optical adhesive, it is favourable for it to comprise a plasticiser. Methyl salicylate may be used as a suitable plasticiser. In this case, it is favourable for methyl salicylate to be contained in an amount of from about 17.00% to 25.00%, expressed in terms of the total weight of the optical adhesive. As an alternative, for example, it is also possible to use benzyl salicylate; hydroxyethyl salicylate, benzyl benzoate, 1-phenylnaphthalene, diisopropylnaphthalene, isopropyl biphenyl or 2-trifluormethylbenzyl alcohol.

In particular when the refractive index $n_2(\lambda)$ of the material of the second layer is less than the refractive index $n_1(\lambda)$ of the material of the first layer, it is favourable for the material of the second layer to be obtained by curing the optical adhesive. Optical adhesives generally have a somewhat higher dispersion.

It is favourable for the material of the first layer to be an optical glass material, since diffraction structures whose geometry is very close to the ideal geometry can be produced with small profile depths h thereon.

With a view to simple production of the diffractive optical elements, it is then favourable for the optical glass material of the first layer to be a press-mouldable optical glass material. In this case, the diffraction structure can be produced comparatively easily by means of blank press moulding, which is known per se, in this press-mouldable optical glass material onto which the optical adhesive is subsequently applied.

As an alternative, the material of the first layer may also be an optical plastic material.

An optical adhesive which has approximately the following refractive indices $n_2(\lambda[nm])$ after its curing has been found to be favourable: $n_2(435.8)=1.6459$; $n_2(480.0)=1.6319$; $n_2(546.1)=1.6188$; $n_2(589.3)=1.6131$; $n_2(643.8)=1.6074$. Such an optical adhesive is specified below in Example 1.

As an alternative, a diffractive optical element in which the material of the second layer, i.e. the optical adhesive, has approximately the following refractive indices $n_2(\lambda[nm])$ after curing has been found advantageous: $n_2(435.8)=1.6318$; $n_2(480.0)=1.6185$; $n_2(546.1)=1.6061$; $n_2(589.3)=1.6009$; $n_2(643.8)=1.5957$. Such an optical adhesive is specified below in Example 2.

A second layer consisting of one of these two materials may advantageously be combined with a first layer, the material of which has approximately the following refractive indices $n_1(\lambda\ [nm])$, in order to form a diffractive optical element: $n_1(435.8)=1.68453$; $n_1(480.0)=1.67864$; $n_1(546.1)=1.67243$; $n_1(589.3)=1.66944$; $n_1(643.9)=1.66646$. Such a material for the first layer is available, for example, in the form of the press-mouldable glass K-VC78 from Sumita Optical Glass Inc.

As an alternative, an optical adhesive which has approximately the following refractive indices $n_2(\lambda[nm])$ when cured has been found favourable: $n_2(435.8)=1.7101$; $n_2(480.0)=1.6923$; $n_2(546.1)=1.6762$; $n_2(589.3)=1.6689$; $n_2(643.8)=1.6621$. Such an optical adhesive is specified below in Example 3.

This optical adhesive may preferably be combined with a material of the first layer having approximately the following refractive indices: $n_1(435.8)=1.77593$; $n_1(480.0)=1.76766$; $n_1(546.1)=1.75906$; $n_1(589.3)=1.75497$; $n_1(643.9)=1.75093$. The latter is available, for example, in the form of the glass K-VC81 from Sumita Optical Glass Inc.

As an alternative, this optical adhesive which is specified in Example 3 may be combined with a material of the first layer having approximately the following refractive indices: $n_1(435.8)=1.76212$; $n_1(480.0)=1.75467$; $n_1(546.1)=1.74688$; $n_1(589.3)=1.74317$; $n_1(643.8)=1.73948$. The latter is available, for example, in the form of the glass N-LAF35 from Schott AG, as specified below in Example 4.

As an alternative, an optical adhesive may advantageously be used which has approximately the following refractive indices after curing: $n_2(435.8)=1.6186$; $n_2(480.0)=1.6063$; $n_2(546.1)=1.5949$; $n_2(589.3)=1.5898$; $n_2(643.8)=1.5847$. Such an optical adhesive is specified below in Example 5.

This may, in particular, be combined with a material of the first layer which has approximately the following refractive indices: $n_1(435.8)=1.64473$; $n_1(480.0)=1.63992$; $n_1(546.1)=1.63483$; $n_1(589.3)=1.63237$; $n_1(643.9)=1.62992$. The latter is available, for example, in the form of the glass K-LaFK60 from Sumita Optical Glass Inc.

Another diffractive optical element having a high diffraction efficiency can be formed when the material of the second layer has approximately the following refractive indices: $n_2(435.8)=1.7413$; $n_2(480.0)=1.7218$; $n_2(546.1)=1.7038$;

$n_2$(589.3)=1.6959; $n_2$(643.8)=1.6886. Such an optical adhesive is specified below in Example 6.

As an alternative, an optical adhesive may advantageously be used which has approximately the following refractive indices after curing: $n_2$(435.8)=1.7433; $n_2$(480.0)=1.7228; $n_2$(546.1)=1.7037; $n_2$(589.3)=1.6958; $n_2$(643.8)=1.6881. Such an optical adhesive is specified below in Example 8.

Each of the optical adhesives according to Example 6 or 8 may advantageously be combined with a material of the first layer having approximately the following refractive indices: $n_1$(435.8)=1.80882; $n_1$(480.0)=1.80056; $n_1$(546.1)=1.79195; $n_1$(589.3)=1.78785; $n_1$(643.8)=1.78380. The latter is available, for example, in the form of the glass N-LAF21 from Schott AG, as specified in Example 6 and in Example 8.

As an alternative, each of the optical adhesives according to Examples 6 and 8 may be combined with a material of the first layer having approximately the following refractive indices: $n_1$(435.8)=1.80837; $n_1$(480.0)=1.79937; $n_1$(546.1)=1.79007; $n_1$(589.3)=1.78567; $n_1$(643.8)=1.78134. The latter is available, for example, in the form of the glass N-LAF33 from Schott AG, as specified below in Example 7 and in Example 9.

Another diffractive optical element having a high diffraction efficiency can be formed when the material of the second layer has approximately the following refractive indices: $n_2$(435.8)=1.7056; $n_2$(480.0)=1.6876; $n_2$(546.1)=1.6714; $n_2$(589.3)=1.6645; $n_2$(643.8)=1.6581. Such an optical adhesive is specified below in Example 10.

This optical adhesive may preferably be combined with a material of the first layer having approximately the following refractive indices: $n_1$(435.8)=1.76212; $n_1$(480.0)=1.75467; $n_1$(546.1)=1.74688; $n_1$(589.3)=1.74317; $n_1$(643.8)=1.73948. The latter is available, for example, in the form of the glass N-LAF35 from Schott AG.

Another diffractive optical element having a high diffraction efficiency can be formed when the material of the second layer has approximately the following refractive indices: $n_2$(435.8)=1.5277; $n_2$(480.0)=1.5216; $n_2$(546.1)=1.5153; $n_2$(589.3)=1.5125; $n_2$(643.8)=1.5096. Such an optical adhesive is specified below in Example 11.

This material of the second layer may in particular be combined with a first layer, the material of which has approximately the following refractive indices: $n_1$(435.8)=1.5370; $n_1$(480.0)=1.5324; $n_1$(546.1)=1.5275; $n_1$(589.3)=1.5252; $n_1$(643.9)=1.5229. Such a material is available, for example, in the form of the optical adhesive Zeonex® 480R from Zeon Chemicals L.P.

As an alternative, an optical adhesive may advantageously be used which has approximately the following refractive indices after curing: $n_2$(546.1)=1.6671; $n_2$(589.3)=1.6604; $n_2$(643.8)=1.6540. Such an optical adhesive is specified below in Example 12.

As an alternative, an optical adhesive may advantageously be used which has approximately the following refractive indices after curing: $n_2$(435.8)=1.7428; $n_2$(480.0)=1.7195; $n_2$(546.1)=1.7001; $n_2$(578.0)=1.6935; $n_2$(589.3)=1.6918; $n_2$(643.8)=1.6839. Such an optical adhesive is specified below in Example 13.

As regards the dimensions of the diffractive optical element, it is favourable for the layer consisting of curable optical adhesive to be at least 5 μm, preferably at least 10 μm, more preferably at least 25 μm and even more preferably at least 50 μm thick at its thinnest position.

It may be favourable for the outer surface of the second layer, which faces away from the first layer, to be configured as a refractive lens surface. With a view to a converging effect of the diffractive optical element, it is advantageous for this to be formed convexly. If, alternatively, a diverging effect of the diffractive optical element is desired, the refractive lens surface of the second layer is preferably formed concavely.

It can be difficult to process the free outer surface of the cured optical adhesive with optical accuracy. In this case, it may be favourable for a third layer consisting of a material having a refractive index $n_3(\lambda)$ to lie adjacent to the outer surface of the second layer, which faces away from the first layer. The refractive index $n_3(\lambda)$ may then differ from the refractive indices $n_1(\lambda)$ and $n_2(\lambda)$. The refractive index $n_3(\lambda)$ may also coincide with one of the refractive indices $n_1(\lambda)$ and $n_2(\lambda)$.

The material of this third layer may be selected according to the desired requirements and, for example, may be an optical glass or an optical plastic. Here again, it may be favourable for the outer surface of the third layer, which faces away from the second layer, to be configured as a refractive lens surface. With a view to a converging effect of the diffractive optical element, the refractive lens surface of the third layer may preferably be formed convexly. If, alternatively, a diverging effect of the diffractive optical element is desired, the refractive lens surface of the third layer is preferably formed concavely.

The invention furthermore provides the use of an optical adhesive for the production of a diffractive optical element. The advantages thereof are correspondingly given in principle by that which has been stated above concerning the optical adhesive.

The invention will be explained in more detail below with the aid of the drawings and selected examples. In the drawings.

Figure 4:
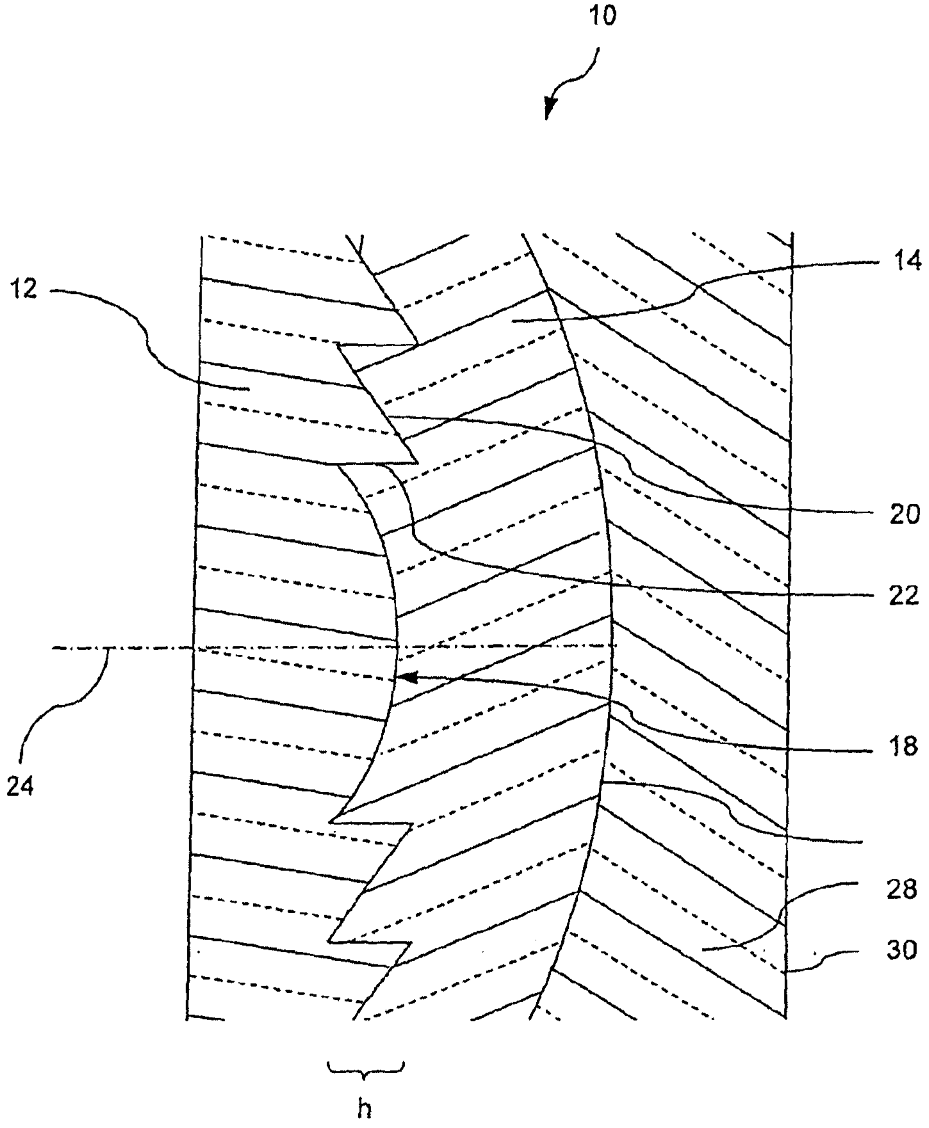

FIG. 4 shows a partial section corresponding to FIG. 2 of a fifth exemplary embodiment of a diffractive optical element consisting of three layers, the outer surface of the second layer being configured as a refractive lens surface; and FIGS. 5 to 15 respectively show graphs in which the dependency of the diffraction efficiency on the wavelength is shown for a diffractive optical element having an optical adhesive according to one of Examples 1 to 11 as specified below.

Figure 1A:
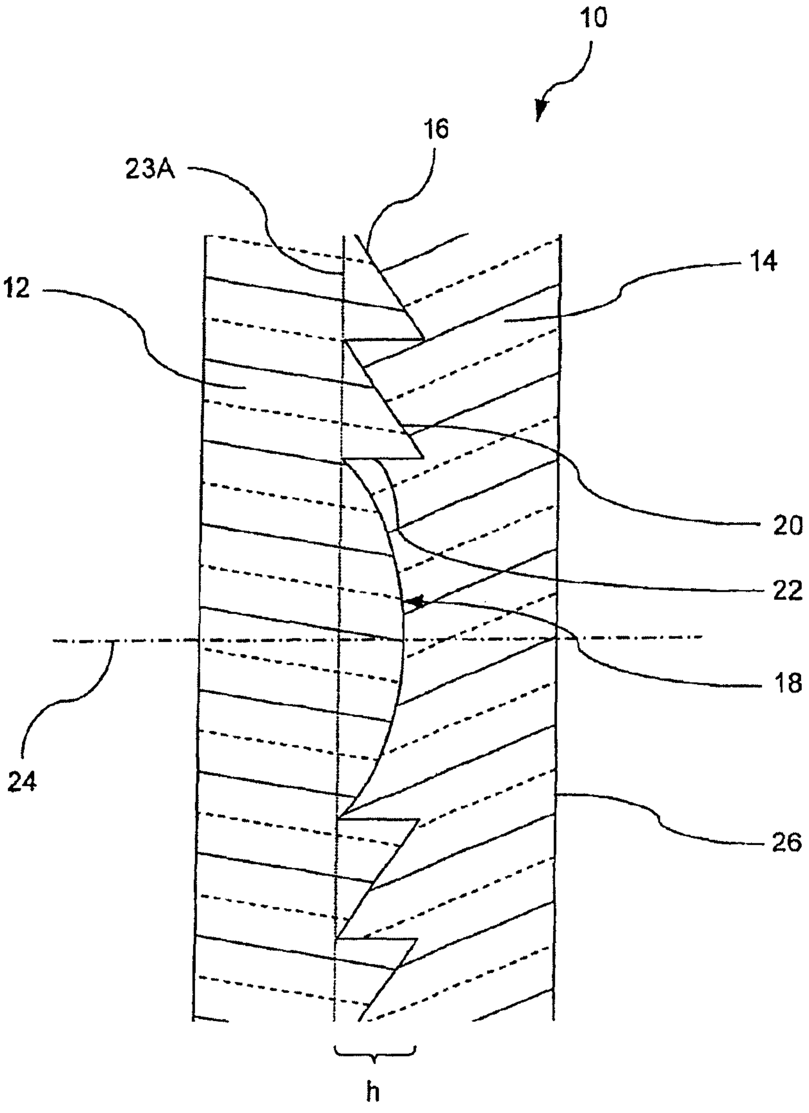
FIG. 1A shows a partial section of a first exemplary embodiment of a diffractive optical element consisting of two layers, in which a diffraction structure extends parallel to a plane surface.
Figure 1B:
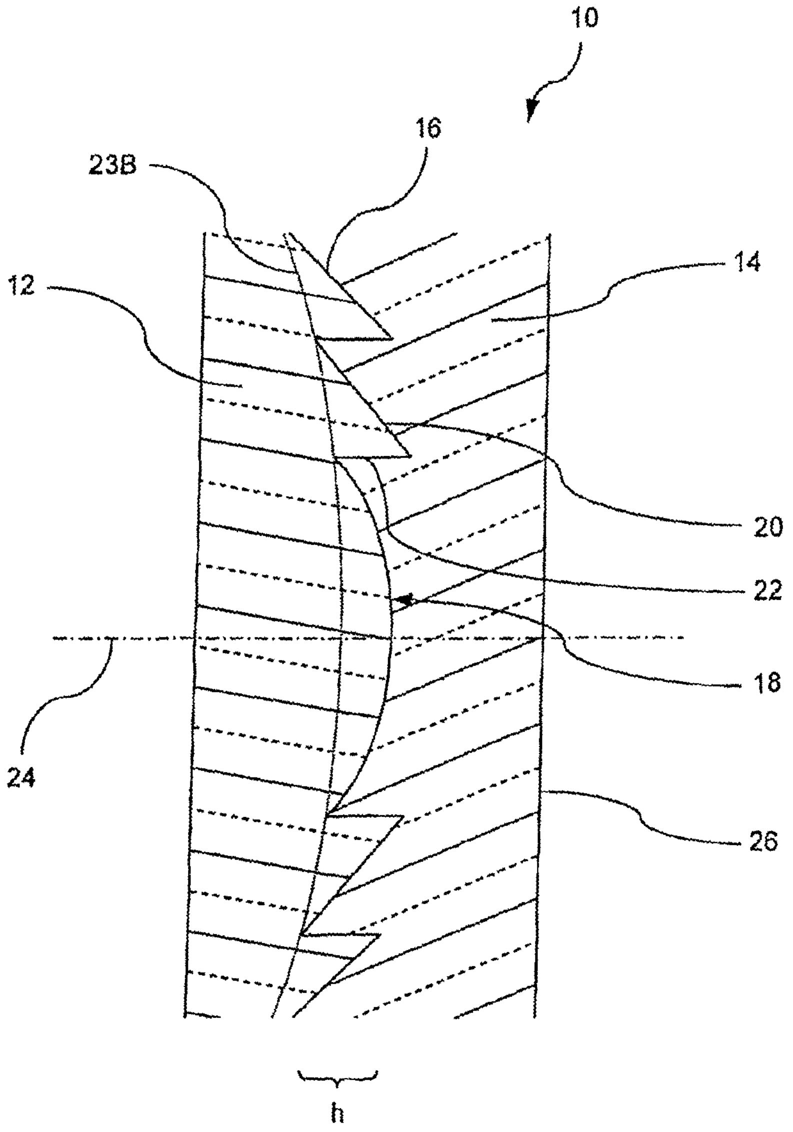
FIG. 1B shows a partial section of a variant of the exemplary embodiment according to FIG. 1, in which the diffraction structure extends parallel to a curved surface.

FIGS. 1A and 1B respectively show a partial section of a diffractive optical element 10 which has a first layer 12 consisting of a material having a refractive index $n_1(\lambda)$ and a second layer 14, adjacent thereto, consisting of a material having a refractive index $n_2(\lambda)$. The refractive index $n_1(\lambda)$ of the first material is higher than the refractive index is $n_2(\lambda)$ of the second material.

Extending between the first layer 12 and the second layer 14, there is an interface 16 on which a diffraction structure 18 having a blazed profile is formed, in order to achieve a high efficiency in a selected diffraction order. The diffraction structure 18 has a plurality of blaze edges 20, inclined with respect to a reference plane, and corresponding anti-blaze edges 22. In FIGS. 1A and 1B, the reference plane extends perpendicularly to the optical axis 24 of the diffractive optical element 10, which is indicated by dots and dashes.

Surfaces which are arranged inclined with respect to the reference plane in question can be approximated by a staircase-like profile, which is also referred to as a multilevel profile. The extent of the anti-blaze edge 22 corresponds to the profile depth h of the diffraction structure 18.

In FIG. 1A, the diffraction structure 18 extends parallel to a plane surface 23A, which is indicated by a dotted line. On the other hand, the diffraction structure 18 in FIG. 1B extends parallel to a surface 23B which is curved axisymmetrically with respect to the optical axis 24 and is likewise indicated by a dotted line. The anti-blaze edges 22 in the ideal case extend parallel to the path of light rays in the first layer 12. In the configurations according to FIGS. 1A and 1B, the respective anti-blaze edges 22 also extend parallel to the optical axis 24.

In the configuration according to FIG. 1B, a converging effect is already achieved at the interface between the first layer 12 and the second layer 14. A spreading effect may for example be achieved with a diffraction structure whose profile corresponds to that of the diffraction structure 18 in FIG. 1A, when it is mirrored on the plane surface 23A.

The outer surface 26 of the second layer 14, which faces away from the diffraction structure 18 of the diffractive optical element 10, is configured in a planar fashion in the diffractive optical element 10 in FIGS. 1A and 1B.

Figure 2:
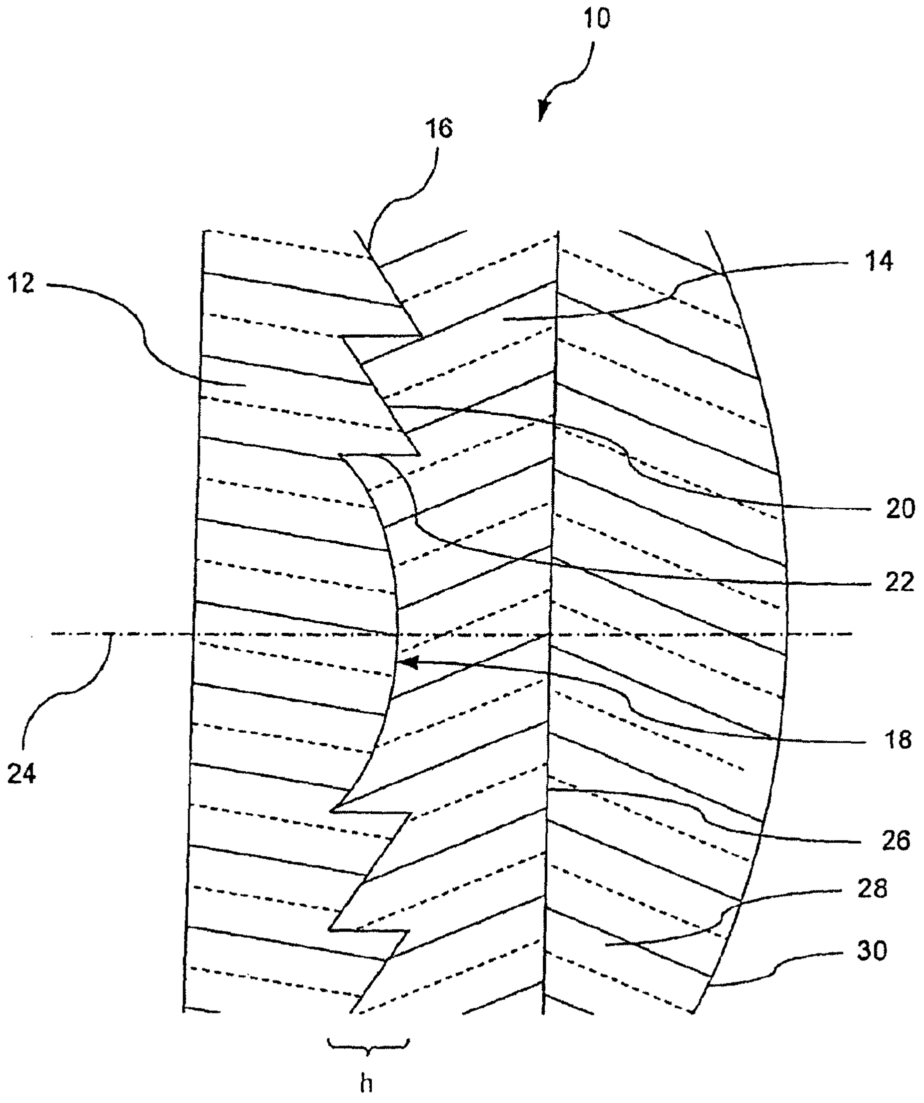
FIG. 2 shows a partial section of a third exemplary embodiment of a diffractive optical element, with a third layer lying adjacent to the second layer.

In the diffractive optical element 10 shown in FIG. 2, a third layer 28 consisting of a material having a refractive index $n_3(\lambda)$ lies adjacent to this plane outer surface 26. Its outer surface 30, which faces away from the second layer 14, is configured as a convex lens surface.

Figure 3:
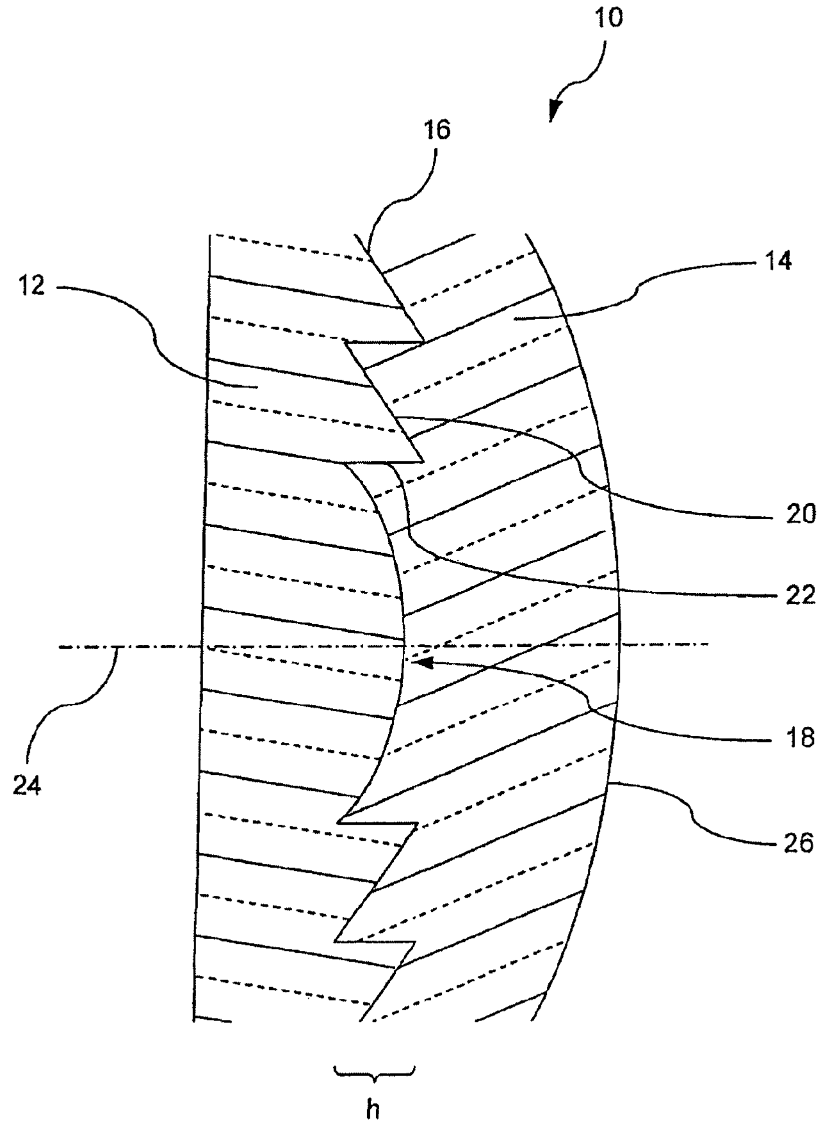
FIG. 3 shows a partial section corresponding to FIG. 1 of a fourth exemplary embodiment of a diffractive optical element consisting of two layers, the outer surface of the second layer being configured as a refractive lens surface.

In a variant according to FIG. 3, the outer surface 26 of the second layer 14 is configured as a convex lens surface, without the diffractive optical element 10 having a third layer.

In another variant, shown in FIG. 4, the third layer 28 consisting of a material having the refractive index $n_3(\lambda)$ lies adjacent to this outer surface 26, which is configured as a refractive lens surface, of the second layer 14 of the diffractive optical element, the outer surface 30 of the third layer 28 being configured in a planar fashion.

The second layer 14 of the exemplary embodiments, shown in FIGS. 1 to 4, of the diffractive optical element 10 is obtained by curing an optical adhesive.

The exemplary embodiments according to FIGS. 2 to 4 may be modified so that once again the diffraction structure 18 extends parallel to a curved surface 23B, as shown in FIG. 1B. If the respective outer surface 26 or 30 of the corresponding diffractive optical element 10 is configured as a curved lens surface, its curvature need not coincide with that of the curved surface 23B, but may differ from it.

The diffraction structures 18 of the diffractive elements 10 according to the exemplary embodiments according to FIGS. 1 to 4 are configured axisymmetrically with respect to the optical axis 24. In a variant, non-axisymmetric diffraction structures 18 are also possible, for example line gratings.

The third layer 28, provided in the exemplary embodiments according to FIGS. 2 and 4, has no effect on the diffraction efficiency $\eta(\lambda)$ of the diffractive elements 10.

Examples 1 to 11, described below, contain on the one hand various alternatives in respect of the composition of an optical adhesive based on an epoxy compound as the material for the second layer 14, and on the other hand proposals for the material from which the first layer 12 may be formed depending on the optical adhesive adopted, in order to achieve a diffraction efficiency $\eta(\lambda)$ which is as high as possible over a wavelength range which is as large as possible.

In the diffractive optical elements produced according to Examples 1 to 11, it is possible to achieve the relatively small profile depths h respectively indicated below, so that the angle of incidence of the light on the diffractive optical element has only a minor effect on its diffraction efficiency $\eta(\lambda)$.

Examples 12 and 13 specify two alternative compositions of an optical adhesive, based on a thiol-ene system, as the material for the second layer 14.

EXAMPLE 1

| | Amount [wt. %] | Component |
|---|---|---|
| Material A | 30 | N,N-diglycidyl-4-glycidyl-oxyaniline |
| | 45 | bis-[4-(2,3-epoxypropylthio)-phenyl] sulfide |
| | 25 | methyl salicylate |
| | 1 | 3-glycidyloxypropyltrimethoxysilane |
| Material B | | trimethylhexamethylene-1,6-diamine |
| Adhesive | 100 | material A |
| | 21 | material B |

The cured optical adhesive has the following refractive indices $n(\lambda)$ at the wavelengths indicated:

| Wavelength $\lambda$ [nm] | Refractive index $n(\lambda)$ |
|---|---|
| 435.8 | 1.6459 |
| 480.0 | 1.6319 |
| 546.1 | 1.6188 |
| 589.3 | 1.6131 |
| 643.8 | 1.6074 |

The specified optical adhesive was combined with a first layer consisting of the press moulding glass K-VC78 from Sumita Optical Glass Inc. to form a diffractive optical element, the diffraction structure of which has a profile depth h=10.66 μm. The adhesive mixture was cured for 24 hours at room temperature and a further 8 hours at 50° C.

Figure 5:
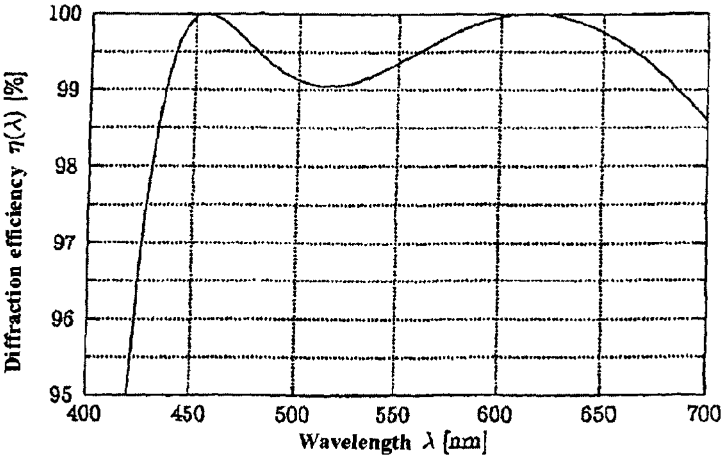

FIG. 5 shows the diffraction efficiency $\eta(\lambda)$ of the diffractive optical element obtained in this way, over a wavelength range of from 400 nm to 700 nm. The diffraction efficiency $\eta(\lambda)$ was calculated with the aid of Equation (3). This calculation did not take into account the so-called index drop which takes place when press moulding the glass K-VC78. An index drop is intended to mean a slight reduction in the refractive index of the glass due to rapid cooling. As can be seen in FIG. 5, the diffraction efficiency $\eta(\lambda)$ is more than 98% in the wavelength range between 430 nm and 700 nm.

EXAMPLE 2

| | Amount [wt. %] | Component |
|---|---|---|
| Material A | 40 | N,N-diglycidyl-4-glycidyl-oxyaniline |
| | 30 | bis-[4-(2,3-epoxypropylthio)-phenyl] sulfide |
| | 30 | methyl salicylate |
| | 1 | 3-glycidyloxypropyltrimethoxysilane |
| Material B | | trimethylhexamethylene-1,6-diamine |
| Adhesive | 100 | material A |
| | 22 | material B |

The cured optical adhesive has the following refractive indices n(λ) at the wavelengths indicated:

| Wavelength λ [nm] | Refractive index n(λ) |
|---|---|
| 435.8 | 1.6318 |
| 480.0 | 1.6185 |
| 546.1 | 1.6061 |
| 589.3 | 1.6009 |
| 643.8 | 1.5957 |

The specified optical adhesive was combined with a first layer consisting of the press moulding glass K-VC78 from Sumita Optical Glass Inc. to form a diffractive optical element, the diffraction structure of which has a profile depth h=8.47 μm. The adhesive mixture was cured for 24 hours at room temperature and a further 8 hours at 50° C.

Figure 6:
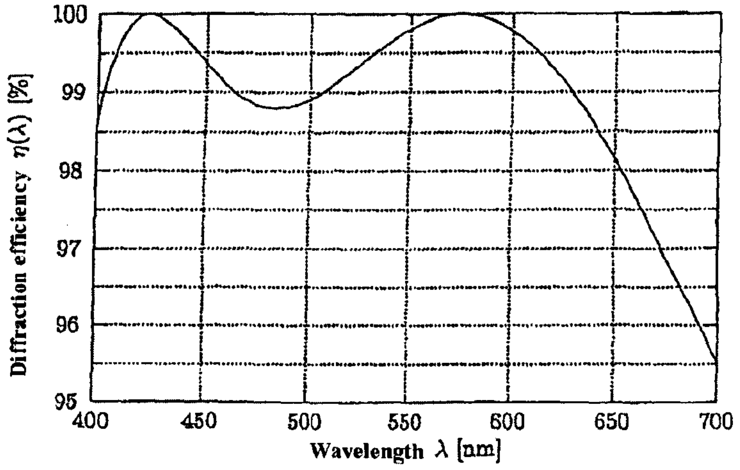

FIG. 6 shows the diffraction efficiency η(λ) of the diffractive optical element obtained in this way, over a wavelength range of from 400 nm to 700 nm. The diffraction efficiency η(λ) was calculated with the aid of Equation (3). This calculation did not take into account the so-called index drop which takes place when press moulding the glass K-VC78. As can be seen in FIG. 6, the diffraction efficiency η(λ) is more than 98% in the wavelength range between 400 nm and 650 nm.

EXAMPLE 3

| | Amount [wt. %] | Component |
|---|---|---|
| Material A | 100 | bis-[4-(2,3-epoxypropylthio)-phenyl] sulfide |
| | 1 | 3-glycidyloxypropyltrimethoxysilane |
| Material B | | trimethylhexamethylene-1,6-diamine |
| Adhesive | 100 | material A |
| | 20 | material B |

The cured optical adhesive has the following refractive indices n(λ) at the wavelengths indicated:

| Wavelength λ [nm] | Refractive index n (λ) |
|---|---|
| 435.8 | 1.7101 |
| 480.0 | 1.6923 |
| 546.1 | 1.6762 |
| 589.3 | 1.6689 |
| 643.8 | 1.6621 |

The specified optical adhesive was combined with a first layer consisting of the press moulding glass K-VC81 from Sumita Optical Glass Inc. to form a diffractive optical element, the diffraction structure of which has a profile depth h=6.75 μm. The adhesive mixture was cured for 24 hours at room temperature and a further 8 hours at 50° C.

Figure 7:
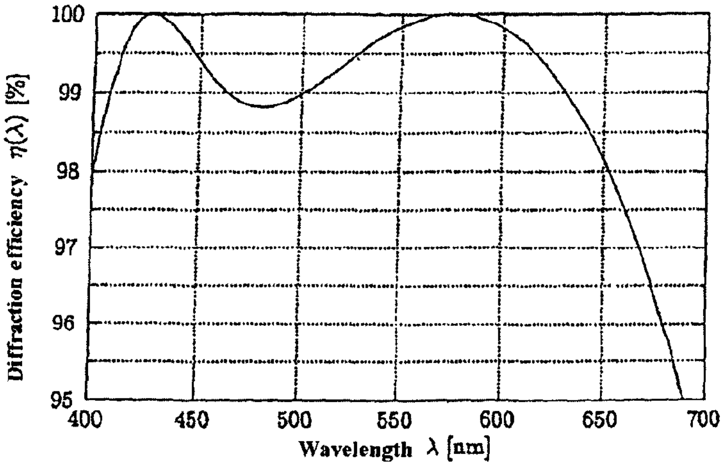

FIG. 7 shows the diffraction efficiency η(λ) of the diffractive optical element obtained in this way, over a wavelength range of from 400 nm to 700 nm. The diffraction efficiency η(λ) was calculated with the aid of Equation (3).

This calculation did not take into account the so-called index drop which takes place when press moulding the glass K-VC81. As can be seen in FIG. 7, the diffraction efficiency η(λ) is more than 98% in the wavelength range between 400 nm and 650 nm.

EXAMPLE 4

The optical adhesive specified in Example 3 was combined with a first layer consisting of the glass N-LAF35 from Schott AG to form a diffractive optical element, the diffraction structure of which has a profile depth h=8.03 μm. The adhesive mixture was cured for 24 hours at room temperature and a further 8 hours at 50° C.

Figure 8:
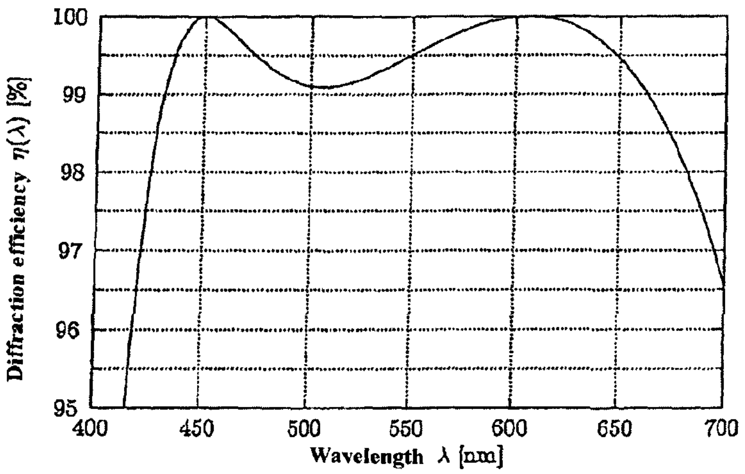

FIG. 8 shows the diffraction efficiency η(λ) of the diffractive optical element obtained in this way, over a wavelength range of from 400 nm to 700 nm. The diffraction efficiency η(λ) was calculated with the aid of Equation (3). As can be seen in FIG. 8, the diffraction efficiency η(λ) is more than 98% in the wavelength range between 420 nm and 660 nm.

EXAMPLE 5

| | Amount [wt. %] | Component |
|---|---|---|
| Material A | 35 | N,N-diglycidyl-4-glycidyl-oxyaniline |
| | 25 | bis-[4-(2,3-epoxypropylthio)-phenyl] sulfide |
| | 10 | glycidyl methyl phenyl ether |
| | 30 | methyl salicylate |
| | 1 | 3-glycidyloxypropyltrimethoxysilane |
| Material B | | trimethylhexamethylene-1,6-diamine |
| Adhesive | 100 | material A |
| | 21 | material B |

The cured optical adhesive has the following refractive indices n(λ) at the wavelengths indicated:

| Wavelength λ [nm] | Refractive index n (λ) |
|---|---|
| 435.8 | 1.6186 |
| 480.0 | 1.6063 |
| 546.1 | 1.5949 |
| 589.3 | 1.5898 |
| 643.8 | 1.5847 |

The specified optical adhesive was combined with a first layer consisting of the press moulding glass K-LaFK60 from Sumita Optical Glass Inc. to form a diffractive optical element, the diffraction structure of which has a profile depth h=14.3 μm. The adhesive mixture was cured for 24 hours at room temperature and a further 8 hours at 50° C.

Figure 9:
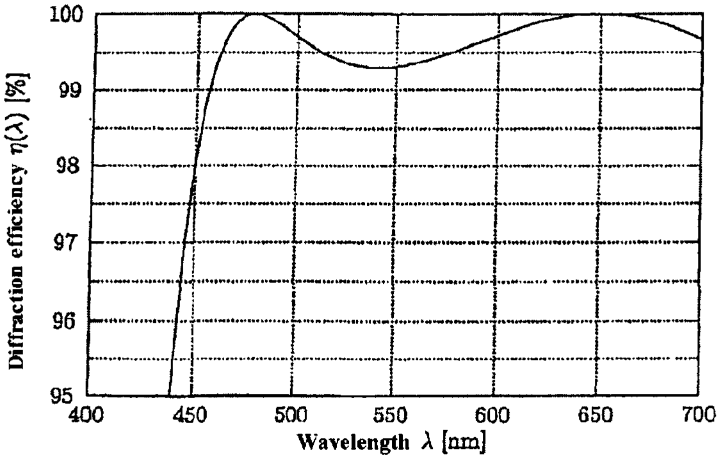

FIG. 9 shows the diffraction efficiency η(λ) of the diffractive optical element obtained in this way, over a wavelength range of from 400 nm to 700 nm. The diffraction efficiency η(λ) was calculated with the aid of Equation (3). This calculation did not take into account the so-called index drop which takes place when press moulding the glass K-LaFK60. As can be seen in FIG. 9, the diffraction efficiency η(λ) is more than 98% in the wavelength range between 450 nm and 700 nm.

EXAMPLE 6

| | Amount [wt. %] | Component |
|---|---|---|
| Material A | 100 | bis-[4-(2,3-epoxypropylthio)-phenyl] sulfide |
| | 1 | 3-glycidyloxypropyltrimethoxysilane |

-continued

| | Amount [wt. %] | Component |
|---|---|---|
| Material B | | diamino-m-xylene |
| Adhesive | 100 | material A |
| | 17 | material B |

The cured optical adhesive has the following refractive indices n(λ) at the wavelengths indicated:

| Wavelength λ [nm] | Refractive index n (λ) |
|---|---|
| 435.8 | 1.7413 |
| 480.0 | 1.7218 |
| 546.1 | 1.7038 |
| 589.3 | 1.6959 |
| 643.8 | 1.6886 |

The specified optical adhesive was combined with a first layer consisting of the glass N-LAF21 from Schott AG to form a diffractive optical element, the diffraction structure of which has a profile depth h=6.41 μm. The adhesive mixture was cured for 24 hours at room temperature and a further 8 hours at 50° C.

Figure 10:
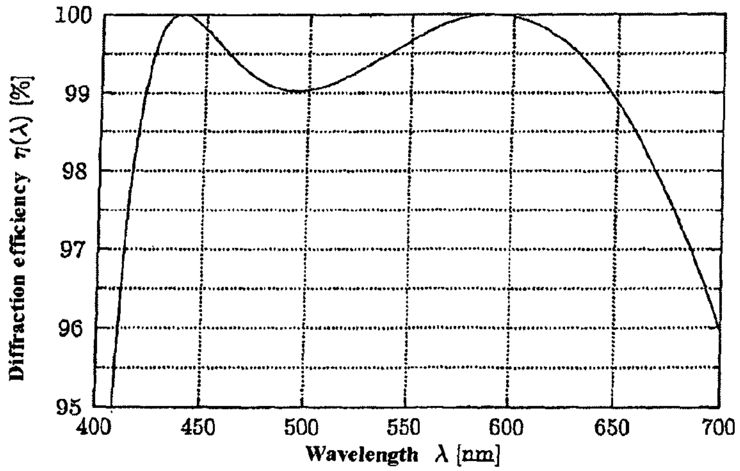

FIG. 10 shows the diffraction efficiency η(λ) of the diffractive optical element obtained in this way, over a wavelength range of from 400 nm to 700 nm. The diffraction efficiency η(λ) was calculated with the aid of Equation (3). As can be seen in FIG. 10, the diffraction efficiency η(λ) is more than 98% in the wavelength range between 420 nm and 670 nm.

EXAMPLE 7

The optical adhesive specified in Example 6 was combined with a first layer consisting of the glass N-LAF33 from Schott AG to form a diffractive optical element, the diffraction structure of which has a profile depth h=6.51 μm. The adhesive mixture was cured for 24 hours at room temperature and a further 8 hours at 50° C.

Figure 11:
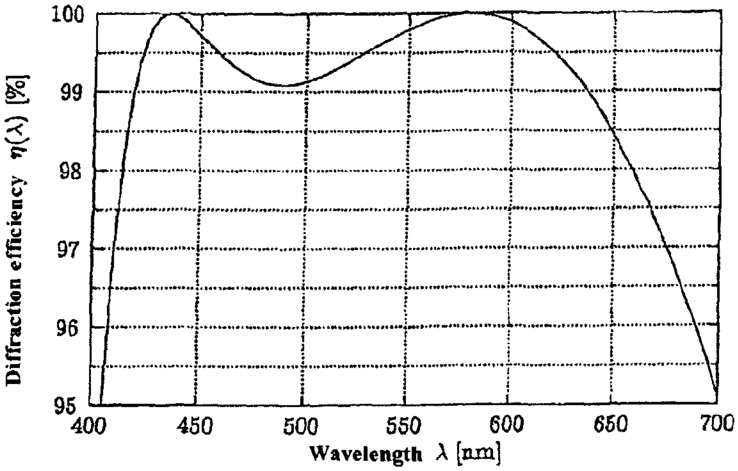

FIG. 11 shows the diffraction efficiency η(λ) of the diffractive optical element obtained in this way, over a wavelength range of from 400 nm to 700 nm. The diffraction efficiency η(λ) was calculated with the aid of Equation (3). As can be seen in FIG. 11, the diffraction efficiency η(λ) is more than 98% in the wavelength range between 420 nm and 660 nm.

EXAMPLE 8

| | Amount [wt. %] | Component |
|---|---|---|
| Material A | 100 | bis-[4-(2,3-epoxypropylthio)-phenyl] sulfide |
| | 1 | 3-glycidyloxypropyltrimethoxysilane |
| Material B | | Naphthalene-methylamine |
| Adhesive | 100 | material A |
| | 40 | material B |

The cured optical adhesive has the following refractive indices n(λ) at the wavelengths indicated:

| Wavelength λ [nm] | Refractive index n (λ) |
|---|---|
| 435.8 | 1.7433 |
| 480.0 | 1.7228 |
| 546.1 | 1.7037 |
| 589.3 | 1.6958 |
| 643.8 | 1.6881 |

The specified optical adhesive was combined with a first layer consisting of the glass N-LAF21 from Schott AG to form a diffractive optical element, the diffraction structure of which has a profile depth h=6.45 μm. The adhesive mixture was cured for 24 hours at room temperature and a further 8 hours at 50° C.

Figure 12:
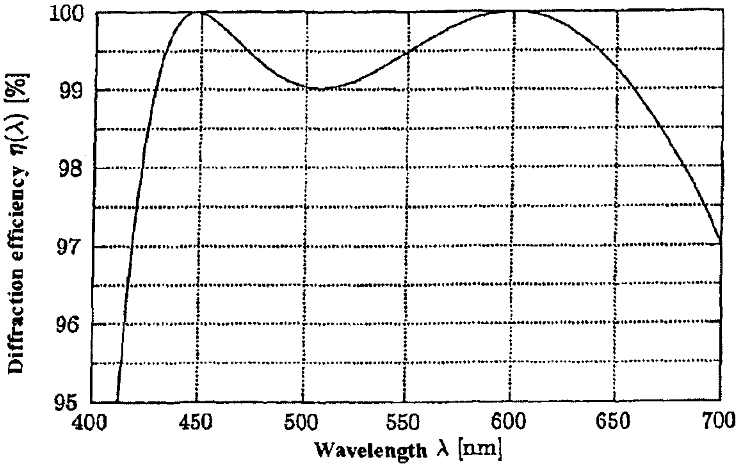

FIG. 12 shows the diffraction efficiency η(λ) of the diffractive optical element obtained in this way, over a wavelength range of from 400 nm to 700 nm. The diffraction efficiency η(λ) was calculated with the aid of Equation (3). As can be seen in FIG. 12, the diffraction efficiency η(λ) is more than 98% in the wavelength range between 430 nm and 680 nm.

EXAMPLE 9

The optical adhesive specified in Example 8 was combined with a first layer consisting of the glass N-LAF33 from Schott AG to form a diffractive optical element, the diffraction structure of which has a profile depth h=6.55 μm. The adhesive mixture was cured for 24 hours at room temperature and a further 8 hours at 50° C.

Figure 13:
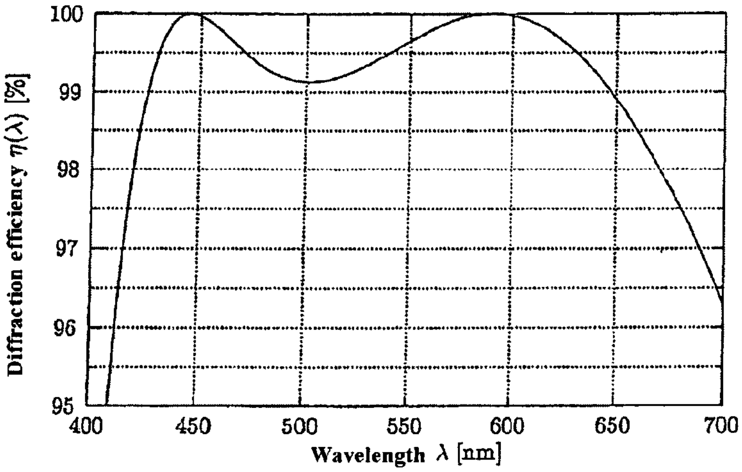

FIG. 13 shows the diffraction efficiency η(λ) of the diffractive optical element obtained in this way, over a wavelength range of from 400 nm to 700 nm. The diffraction efficiency η(λ) was calculated with the aid of Equation (3). As can be seen in FIG. 13, the diffraction efficiency η(λ) is more than 98% in the wavelength range between 420 nm and 660 nm.

EXAMPLE 10

| | Amount [wt. %] | Component |
|---|---|---|
| Material A | 100 | bis-[4-(2,3-epoxypropylthio)-phenyl] sulfide |
| | 1 | 3-glycidyloxypropyltrimethoxysilane |
| Material B | | trimethylolpropane-tri-(3-mercaptopropionate) |
| Material C | | isophorone diamine |
| Adhesive | 100 | material A |
| | 10 | material B |
| | 18 | material C |

Trimethylolpropane-tri-(3-mercaptopropionate) is used as a crosslinker in this adhesive mixture.

The cured optical adhesive has the following refractive indices n(λ) at the wavelengths indicated:

| Wavelength λ [nm] | Refractive index n (λ) |
|---|---|
| 435.8 | 1.7056 |
| 480.0 | 1.6876 |
| 546.1 | 1.6714 |
| 589.3 | 1.6645 |
| 643.8 | 1.6581 |

The specified optical adhesive was combined with a first layer consisting of the glass N-LAF35 from Schott AG to form a diffractive optical element, the diffraction structure of which has a profile depth h=7.43 μm. The adhesive mixture was cured for 24 hours at room temperature and a further 8 hours at 50° C.

Figure 14:
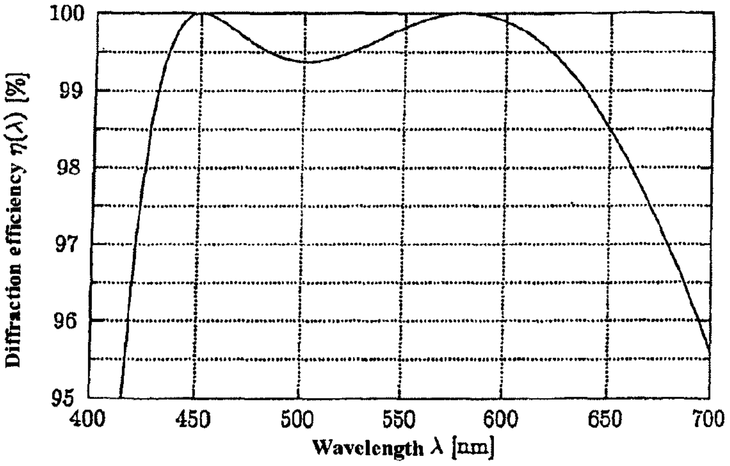

FIG. 14 shows the diffraction efficiency η(λ) of the diffractive optical element obtained in this way, over a wavelength range of from 400 nm to 700 nm. The diffraction efficiency η(λ) was calculated with the aid of Equation (3). As can be seen in FIG. 12, the diffraction efficiency η(λ) is more than 98% in the wavelength range between 430 nm and 660 nm.

EXAMPLE 11

| Amount [wt. %] | Component |
|---|---|
| 100 | bis-(3,4-epoxycyclohexyl) adipate |
| 30 | polyethylene glycol 300 |
| 30 | methyl salicylate |
| 4 | 3-glycidyloxypropyltrimethoxysilane |
| 4 | Triarylsulfonium hexafluoroantimonate |

Triarylsulfonium hexafluoroantimonate is available as a photoinitiator under the name "CYRACURE® UVI-6974" from Dow Chemical Ltd.

The cured optical adhesive has the following refractive indices n(λ) at the wavelengths indicated:

| Wavelength λ [nm] | Refractive index n (λ) |
|---|---|
| 435.8 | 1.5277 |
| 480.0 | 1.5216 |
| 546.1 | 1.5153 |
| 589.3 | 1.5125 |
| 643.8 | 1.5096 |

The specified optical adhesive was combined with a first layer consisting of the optical adhesive Zeonex® 480R from Zeon Chemicals L.P. to form a diffractive optical element, the diffraction structure of which has a profile depth h=46.8 μm. The adhesive mixture was cured by exposure to UV-A light at 40 mW/cm$^2$ for a period of 300 s.

Figure 15:
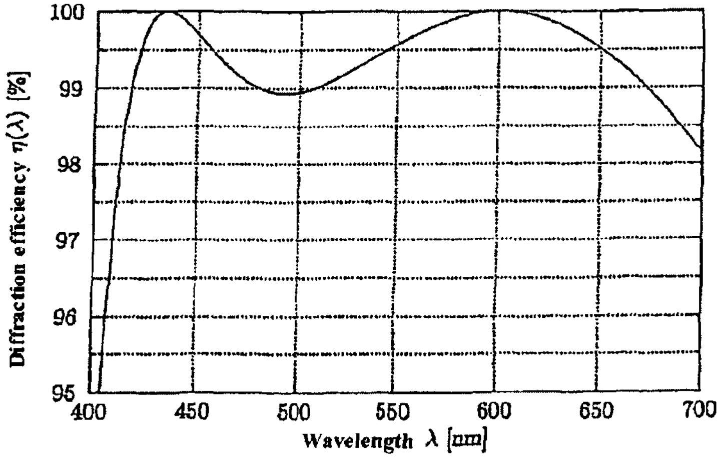

FIG. 15 shows the diffraction efficiency η(λ) of the diffractive optical element obtained in this way, over a wavelength range of from 400 nm to 700 nm. The diffraction efficiency η(λ) was calculated with the aid of Equation (3).

As can be seen in FIG. 15, the diffraction efficiency η(λ) is more than 98% in the wavelength range between 420 nm and 700 nm.

EXAMPLE 12

| Amount [wt. %] | Component |
|---|---|
| 56.2 | bis-(4-vinylthiophenyl) sulfide |
| 43.8 | pentaerythritol tetra-(3-mercaptopropionate) |
| 4 | mixture of 25% bis(2,6-dimethoxybenzoyl)-2,4,4-trimethylpentylphosphine oxide and 75% 2-hydroxy-2-methyl-1-phenyl-propan-1-one |

A mixture consisting of 25% bis(2,6-dimethoxybenzoyl)-2,4,4-trimethylpentylphosphine oxide and 75% 2-hydroxy-2-methyl-1-phenyl-propan-1-one is available as a photoinitiator under the name "IRGACURE® 1700" from Ciba-Geigy Ltd.

The adhesive mixture was cured by exposure to UV-A light at 30 mW/cm$^2$ for a period of 120 s.

The cured optical adhesive has the following refractive indices n(λ) at the wavelengths indicated:

| Wavelength λ [nm] | Refractive index n (λ) |
|---|---|
| 480.0 | 1.6826 |
| 546.1 | 1.6671 |
| 589.3 | 1.6604 |
| 643.8 | 1.6540 |

EXAMPLE 13

| Amount [wt. %] | Component |
|---|---|
| 100 | bis-(4-vinylthiophenyl) sulfide |
| 26 | pentaerythritol tetra-(3-mercaptopropionate) |
| 1 | 3-mercaptopropyl-trimethoxysilane |
| 4 | mixture of 25% bis(2,6-dimethoxybenzoyl)-2,4,4-trimethylpentylphosphine oxide and 75% 2-hydroxy-2-methyl-1-phenyl-propan-1-one |

A mixture consisting of 25% bis(2,6-dimethoxybenzoyl)-2,4,4-trimethylpentylphosphine oxide and 75% 2-hydroxy-2-methyl-1-phenyl-propan-1-one is available as a photoinitiator under the name "IRGACURE® 1700" from Ciba-Geigy Ltd.

The adhesive mixture was cured by exposure to UV-A light at 30 mW/cm$^2$ for a period of 120 s.

The cured optical adhesive has the following refractive indices n(λ) at the wavelengths indicated:

| Wavelength λ [nm] | Refractive index n (λ) |
|---|---|
| 435.8 | 1.7428 |
| 480.0 | 1.7195 |
| 546.1 | 1.7001 |
| 578.0 | 1.6935 |
| 589.3 | 1.6918 |
| 643.8 | 1.6839 |

For the specified Examples 1 to 9, the proportion by weight in % of the components used in the optical adhesive can be calculated according to $$\frac{\text{amount (component)}}{\Sigma\text{amount (component)}} \cdot \frac{100}{(\text{amount (material } A) + \text{amount (material } B)}.$$

For example, the wt. % proportion of N,N-diglycidyl-4-glycidyl-oxyaniline in the optical adhesive according to Example 1 may therefore be calculated for instance as $$\frac{30}{30+45+25+1}\cdot\frac{100}{100+21}=24.55\%$$

and the wt. % proportion of N,N-diglycidyl-4-glycidyl-oxyaniline in the optical adhesive according to Example 2 may be calculated for instance as $$\frac{40}{40+30+30+1}\cdot\frac{100}{100+22}=32.46\%.$$

For the specified Examples 10 to 13, the proportion by weight in % of the components used in the optical adhesive can be calculated according to the same principle.

The invention claimed is:

1. An optical element, comprising:

a) a first layer comprising a first material having a refractive index $n_1(\lambda)$;

b) a second layer comprising a second material having a refractive index $n_2(\lambda)$, the second layer being adjacent the first layer; and c) a diffraction structure at an interface between the first layer and the second layer, wherein:

the first material and/or the second material is obtained by curing an optical adhesive, the optical adhesive is based on an epoxy adhesive or a thiolene system and comprises a compound selected from the group consisting of: bis-[4-(2,3-epoxypropylthio)-phenyl] sulfide; N,N-diglycidyl-4-glycidyl-oxyaniline; bis-(3,4-epoxycyclohexyl) adipate; polyethylene glycol; bis-(4-vinylthiophenyl) sulfide; and pentaerythritol tetra-(3-mercaptopropionate), and the optical element is a diffractive optical element.

2. The optical element according to claim 1, wherein the optical adhesive comprises bis-[4-(2,3-epoxypropylthio)-phenyl] sulfide in an amount of from about 20.00% to about 85.00%, expressed in terms of its total weight.

3. The optical element according to claim 1, wherein the optical adhesive comprises N,N-diglycidyl-4-glycidyl-oxyaniline in an amount of from about 24.00% to about 33.00%, expressed in terms of its total weight.

4. The optical element according to claim 1, wherein the optical adhesive comprises a curer.

5. The optical element according to claim 4, wherein the optical adhesive comprises as a curer a compound selected from the group consisting of:

trimethylhexamethylene-1,6-diamine; diamino-m-xylene; naphthalene-methylamine; and isophorone diamine.

6. The optical element according to claim 5, wherein the optical adhesive comprises as a curer in the amounts specified, expressed in terms of its total weight a compound selected from the group consisting of: trimethylhexamethylene-1,6-diamine in an amount of from about 16.00% to about 18.50%; diamino-m-xylene in an amount of from about 14.00% to about 15.00; naphthalene-methylamine in an amount of from about 28.00% to about 29.00%; and isophorone diamine in an amount of from about 13.50% to about 14.50%.

7. The optical element according to claim 1, wherein the optical adhesive can be cured by electromagnetic radiation.

8. The optical element according to claim 7, wherein the optical adhesive comprises in the amounts specified, expressed in terms of its total weight a compound selected from the group consisting of: bis-(3,4-epoxycyclohexyl) adipate in an amount of from about 55.00% to about 65.00%; bis-(4-vinylthio-phenyl) sulfide in an amount of from about 50.00% to about 80.00%; and pentaerythritol tetra-(3-mercaptopropionate) in an amount of from about 17.00% to about 45.00%.

9. The optical element according to claim 7, wherein the optical adhesive comprises polyethylene glycol in an amount of from about 15.00% to about 20.00%, expressed in terms of its total weight.

10. The optical element according to claim 7, wherein the optical adhesive comprises a photoinitiator.

11. The optical element according to claim 10, wherein the optical adhesive comprises as a photoinitiator a compound selected from the group consisting of:

triarylsulfonium hexafluoroantimonate; triarylsulfonium hexafluorophosphate; bis(2,6-dimethoxybenzoyl)-2,4,4-trimethylpentylphosphine oxide; 2-hydroxy-2-methyl-1-phenyl-propan-1-one; and 1-[4-(1-methylethyl)-phenyl]-2-hydroxy-2-methyl-1-propan-1-one.

12. The optical element according to claim 11, wherein the optical adhesive comprises as a photoinitiator in the amounts specified, expressed in terms of its total weight a compound selected from the group consisting of: triarylsulfonium hexafluorophosphate in an amount of from about 2.00% to about 2.80%; and a mixture comprising 25% bis(2,6-dimethoxybenzoyl) -2,4,4-trimethylpentyl-phosphine oxide and 75% 2-hydroxy-2-methyl-1-phenyl-propan-1-one in an amount of from about 2.50% to about 4.50%.

13. The optical element according to claim 1, wherein the optical adhesive comprises an adhesion promoter.

14. The optical element according to claim 13, wherein the optical adhesive comprises as an adhesion promoter at least one compound selected from the group consisting of: 3-glycidyloxypropyltrimethoxysilane; 3-aminopropyltrimethoxysilane; 3- mercaptopropyl-trimethoxysilane; vinyltrimethoxy-silane; and 3-methacryloxypropyltrimethoxysilane or a similar triethoxysilane.

15. The optical element according to claim 14, wherein the optical adhesive comprises as an adhesion promoter in the amounts specified, expressed in terms of its total weight a compound selected from the group consisting of: 3-glycidyloxypropyltrimethoxysilane in an amount of from about 0.70% to about 2.40%; and 3-mercaptopropyl-trimethoxysilane in an amount of from about 0.70% to about 0.80%.

16. The optical element according to claim 1, wherein the optical adhesive comprises a plasticiser.

17. The optical element according to claim 16, wherein the optical adhesive comprises as a plasticiser a compound selected from the group consisting of: methyl salicylate; benzyl salicylate; hydroxyethyl- salicylate; benzyl benzoate; 1-phenylnaphthalene; diisopropyl-naphthalene; isopropyl biphenyl; and 2-trifluormethylbenzyl alcohol.

18. The optical element according to claim 17, wherein the optical adhesive comprises methyl salicylate in an amount of from about 17.00% to 25.00%, expressed in terms of its total weight.

19. The optical element according to claim 1, wherein the second material is obtained by curing the optical adhesive, and $n_1(\lambda)>n_2(\lambda)$.

20. The optical element according to claim 19, wherein the first material is an optical glass material.

21. The optical element according to claim 20, wherein the first material is a press-mouldable optical glass material.

22. The optical element according to claim 19, wherein the first material is an optical plastic material.

23. The optical element according to claim 1, wherein the cured optical adhesive is at least 5 μm, at its thinnest position.

24. The optical element according to claim 1, wherein the outer surface of the second layer, which faces away from the first layer, is configured as a refractive lens surface.

25. The optical element according to claim 24, wherein the refractive lens surface is convex or concave.

26. The optical element according to claim 1, further comprising a third layer comprising a third material having a refractive index $n_3(\lambda)$ lies adjacent to the outer surface of the second layer, which faces away from the first layer.

27. A method, comprising:

fabricating a diffractive optical element comprising curing an optical adhesive to produce a cured optical adhesive material, wherein the diffractive optical element comprises:

a first layer comprising a first material having a refractive index $n_1(\lambda)$;

a second layer comprising a second material having a refractive index $n_2(\lambda)$, the second layer being adjacent the first layer; and a diffraction structure formed at an interface between the first layer and the second layer, wherein the first material and/or the second material is the cured optical adhesive material, the optical adhesive is based on an epoxy adhesive or a thiolene system and comprises a compound selected from the group consisting of: bis-[4-(2,3-epoxypropylthio)-phenyl] sulfide; N,N-diglycidyl-4-glycidyl-oxyaniline; bis-(3,4-epoxycyclohexyl) adipate; polyethylene glycol; bis-(4-vinylthiophenyl) sulfide; and pentaerythritol tetra-(3-mercaptopropionate).

28. An optical element, comprising:

a) a first layer comprising a first material having a refractive index $n_1(\lambda)$;

b) a second layer comprising a second material having a refractive index $n_2(\lambda)$ the second layer being adjacent the first layer; and c) a diffraction structure at an interface between the first layer and the second layer, wherein:

the first material and/or the second material is obtained by curing an optical adhesive, the optical adhesive comprises a curer and the optical adhesive comprises as a curer a compound selected from the group consisting of: trimethylhexamethylene-1,6-diamine; diamino-m-xylene; naphthalene-methylamine; and isophorone diamine, and the optical element is a diffractive optical element.

29. An optical element, comprising:

a) a first layer comprising a first material having a refractive index $n_1(\lambda)$;

b) a second layer comprising a second material having a refractive index $n_2(\lambda)$, the second layer being adjacent the first layer; and c) a diffraction structure at an interface between the first layer and the second layer, wherein:

the first material and/or the second material is obtained by curing an optical adhesive, the optical adhesive can be cured by electromagnetic radiation and the optical adhesive comprises in the amounts specified, expressed in terms of its total weight a compound selected from the group consisting of: bis-(3,4-epoxycyclohexyl) adipate in an amount of from about 55.00% to about 65.00%; bis-(4-vinylthio-phenyl) sulfide in an amount of from about 50.00% to about 80.00%; and pentaerythritol tetra-(3-mercaptopropionate) in an amount of from about 17.00% to about 45.00%, and the optical element is a diffractive optical element.

30. An optical element, comprising:

a) a first layer comprising a first material having a refractive index $n_1(\lambda)$;

b) a second layer comprising a second material having a refractive index $n_2(\lambda)$, the second layer being adjacent the first layer; and c) a diffraction structure at an interface between the first layer and the second layer, wherein:

the first material and/or the second material is obtained by curing an optical adhesive, the optical adhesive can be cured by electromagnetic radiation and the optical adhesive comprises polyethylene glycol in an amount of from about 15.00% to about 20.00%, expressed in terms of its total weight, and the optical element is a diffractive optical element.

31. An optical element, comprising:

a) a first layer comprising a first material having a refractive index $n_1(\lambda)$;

b) a second layer comprising a second material having a refractive index $n_2(\lambda)$, the second layer being adjacent the first layer; and c) a diffraction structure at an interface between the first layer and the second layer, wherein:

the first material and/or the second material is obtained by curing an optical adhesive, the optical adhesive can be cured by electromagnetic radiation, the optical adhesive comprises a photoinitiator, and the optical adhesive comprises as a photoinitiator a compound selected from the group consisting of: triarylsulfonium hexafluoroantimonate; triarylsulfonium hexafluorophosphate; bis(2,6-dimethoxybenzoyl)-2,4,4-trimethylpentylphosphine oxide; 2-hydroxy-2-methyl-1-phenyl-propan-1-one; and 1-[4-(1-methylethyl)-phenyl]-2-hydroxy-2-methyl-1-propan-1-one, and the optical element is a diffractive optical element.

32. An optical element, comprising:

a) a first layer comprising a first material having a refractive index $n_1(\lambda)$;

b) a second layer comprising a second material having a refractive index $n_2(\lambda)$, the second layer being adjacent the first layer; and c) a diffraction structure at an interface between the first layer and the second layer, wherein:

the first material and/or the second material is obtained by curing an optical adhesive, the optical adhesive comprises an adhesion promoter and the optical adhesive comprises as an adhesion promoter at least one compound selected from the group consisting of: 3-glycidyloxypropyltrimethoxysilane; 3-aminopropyltrimethoxy-silane; 3-mercaptopropyl-trimethoxysilane; vinyltrimethoxy-silane; and 3-methacryloxypropyltrimethoxy-silane or a similar triethoxysilane, and the optical element is a diffractive optical element.

33. An optical element, comprising:

a) a first layer comprising a first material having a refractive index $n_1(\lambda)$;

b) a second layer comprising a second material having a refractive index $n_2(\lambda)$, the second layer being adjacent the first layer; and c) a diffraction structure at an interface between the first layer and the second layer, wherein:

the first material and/or the second material is obtained by curing an optical adhesive, the optical adhesive comprises a plasticiser the optical adhesive comprises as a plasticiser a compound selected from the group consisting of methyl salicylate; benzyl salicylate; hydroxyethyl- salicylate; benzyl benzoate; 1-phenylnaphthalene; diisopropyl-naphthalene; isopropyl biphenyl; and 2-trifluormethylbenzyl alcohol, and the optical element is a diffractive optical element.

* * * * *

UNITED STATES PATENT AND TRADEMARK OFFICE

CERTIFICATE OF CORRECTION

PATENT NO. : 8,503,080 B2
APPLICATION NO. : 12/739702
DATED : August 6, 2013
INVENTOR(S) : Markus Seesselberg It is certified that error appears in the above-identified patent and that said Letters Patent is hereby corrected as shown below:

In the Specification

Column 2, Line 6-8, delete "$h = \lambda_0 / (n_1(\lambda_0) - n_2(\lambda_0))$ with $n_1(\lambda_0) > n_2(\lambda_0)$" insert -- $h = \lambda_0 / (n_1(\lambda_0) - n_2(\lambda_0))$; with $n_1(\lambda_0) > n_2(\lambda_0)$ --;

Column 5, Line 9, delete "Ciby-" insert -- Ciba- --;

Column 5, Line 58, delete "2-trifluormethylbenzyl" insert -- 2-trifluoromethylbenzyl --;

In the Claims

Column 17, Line 58, Claim 6, delete "15.00;" insert -- 15.00%; --;

Column 18, Line 26, Claim 12, delete ") -2," insert -- )-2, --;

Column 18, Line 52, Claim 17, delete "2-trifluormethylbenzyl" insert -- 2-trifluoromethylbenzyl --;

Column 21, Line 14, Claim 33, delete "2-trifluormethylbenzyl" insert -- 2-trifluoromethylbenzyl --.

Signed and Sealed this
Eighth Day of October, 2013

Teresa Stanek Rea

*Deputy Director of the United States Patent and Trademark Office*